O. C. SKINNER.
GEARLESS ROTARY CLUTCH AND TRANSMISSION MECHANISM.
APPLICATION FILED SEPT. 16, 1919.
1,349,229.
Patented Aug. 10, 1920.
4 SHEETS—SHEET 3.
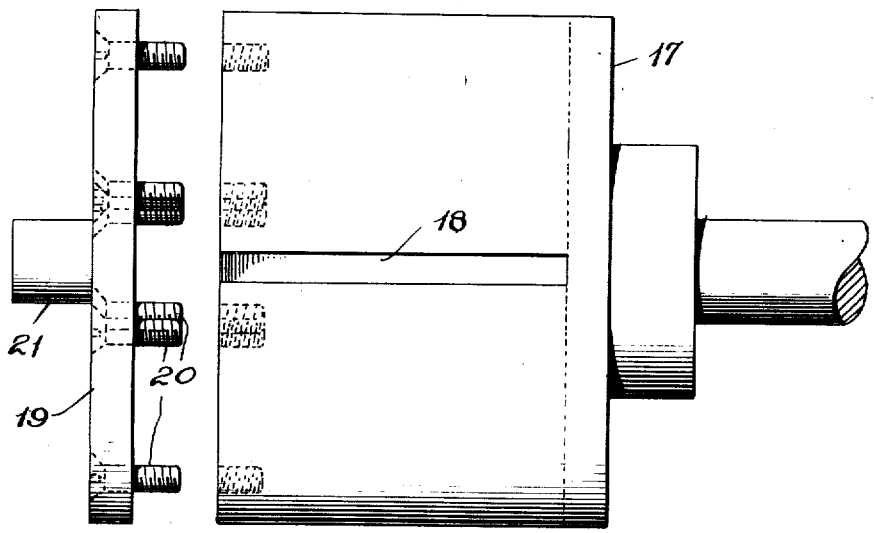
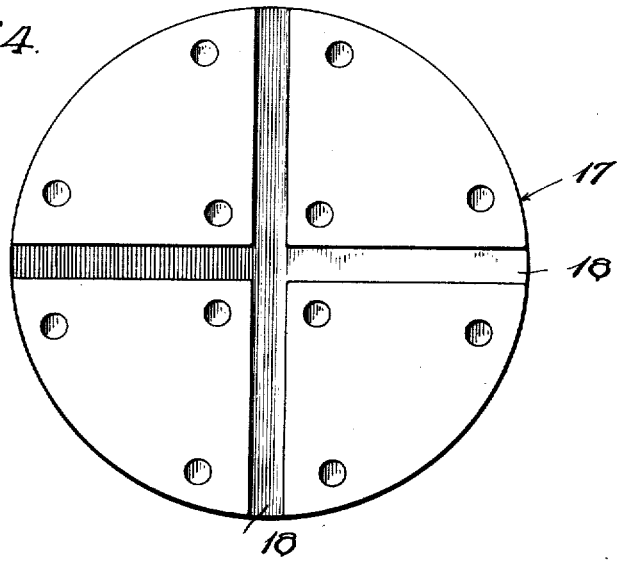
Inventor
Orias C. Skinner
By Watson E. Coleman
Attorney O. C. SKINNER.
GEARLESS ROTARY CLUTCH AND TRANSMISSION MECHANISM.
APPLICATION FILED SEPT. 16, 1919.
1,349,229.
Patented Aug. 10, 1920.
4 SHEETS—SHEET 4.
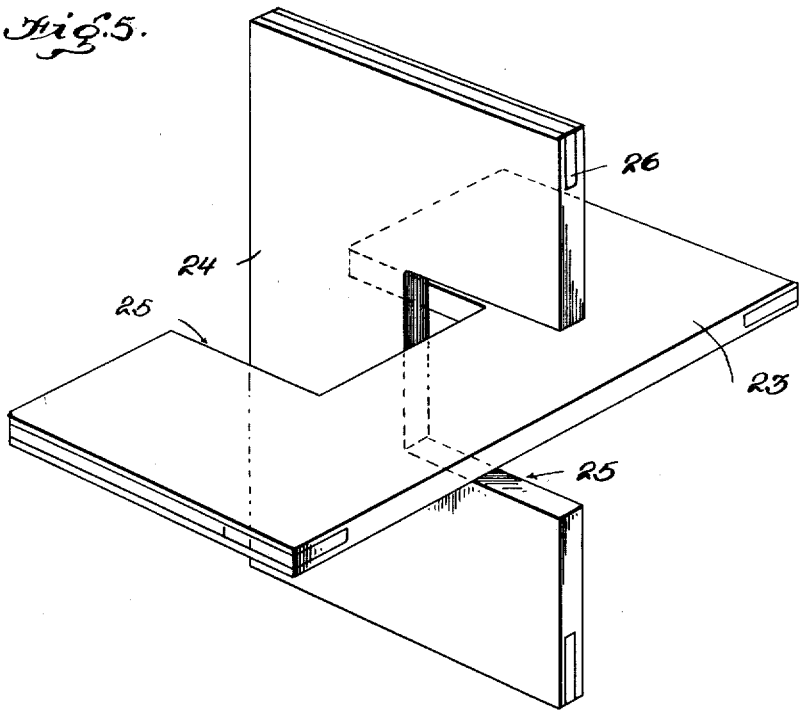
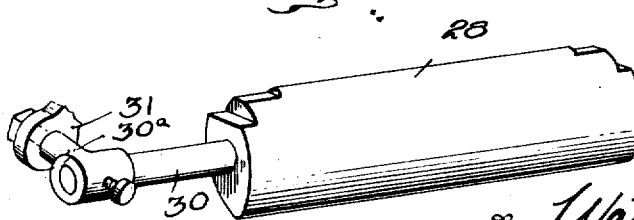

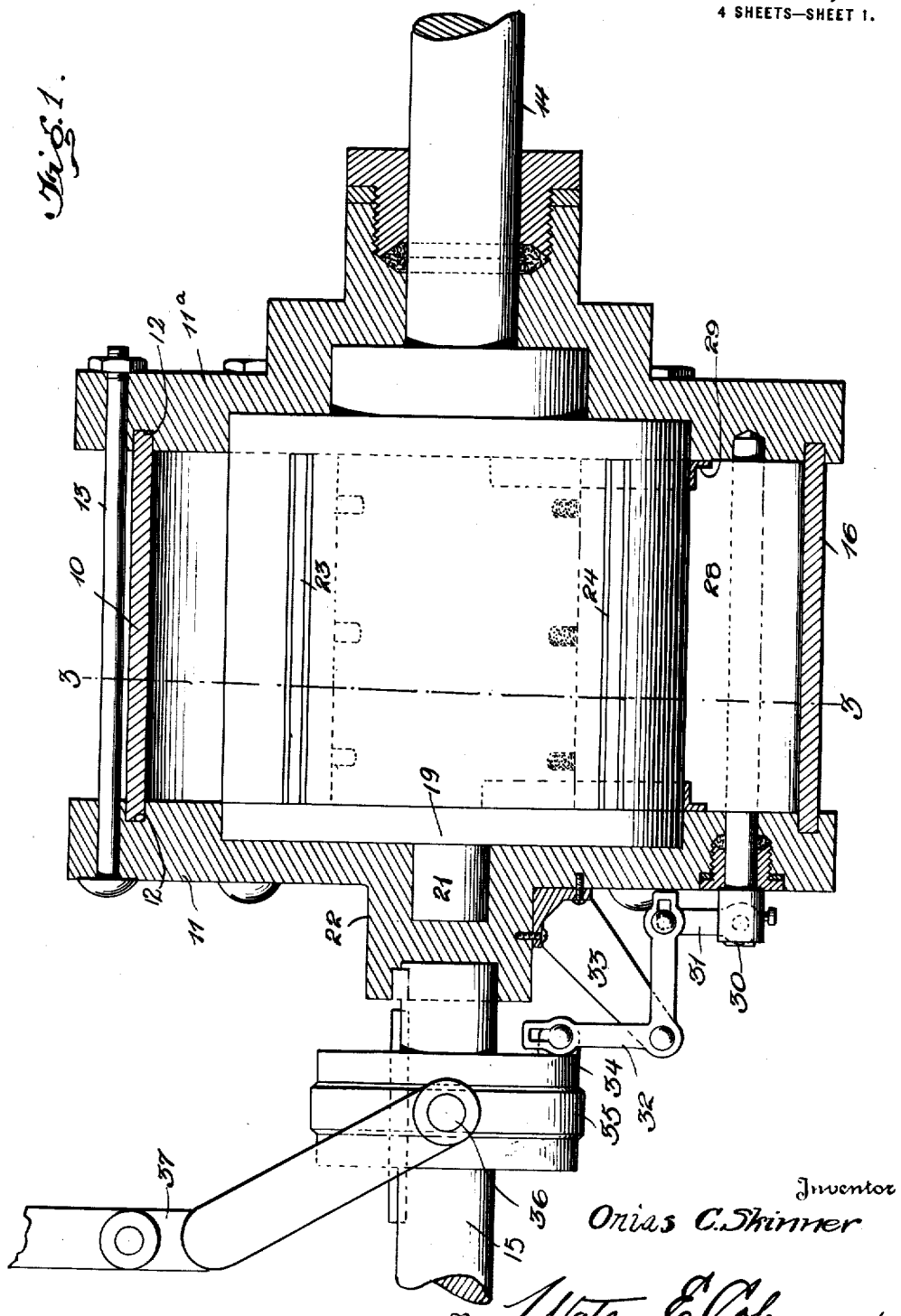

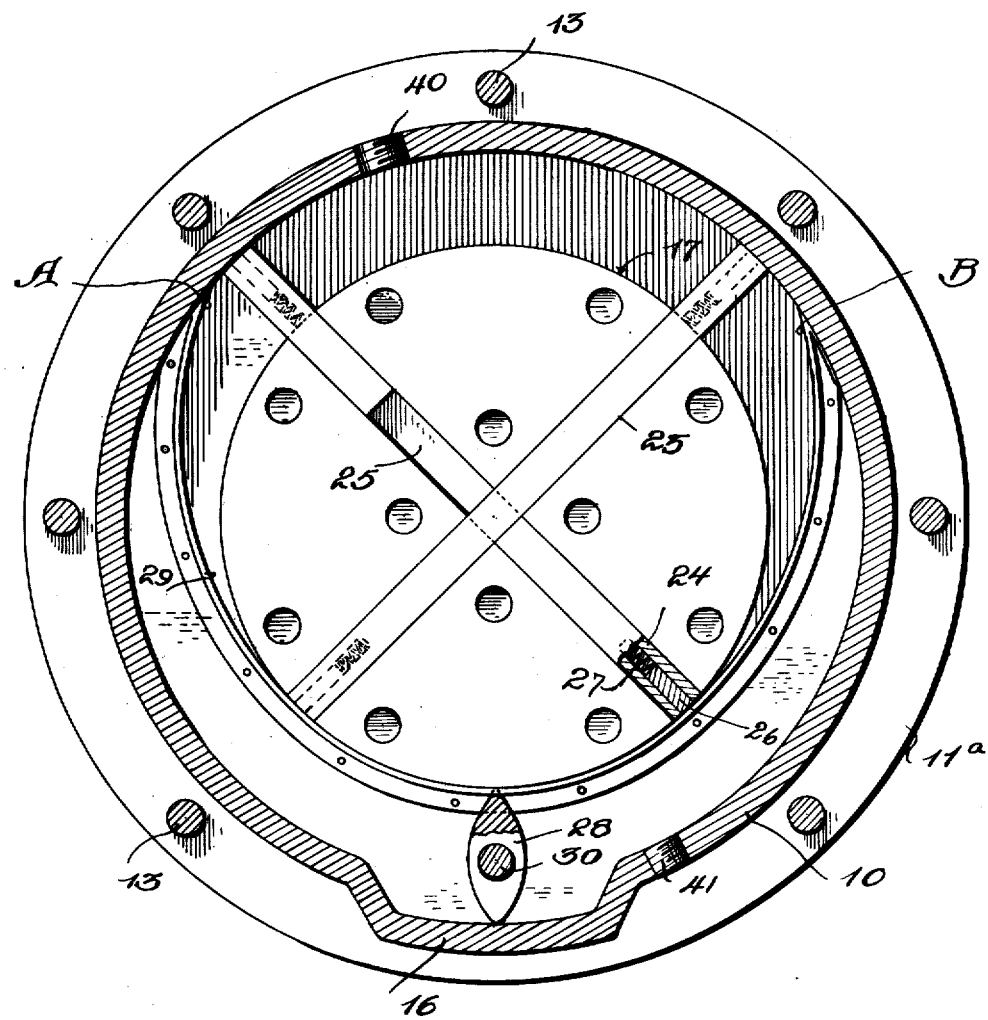

UNITED STATES PATENT OFFICE.

ONIAS C. SKINNER, OF MONTROSE, COLORADO.

GEARLESS ROTARY CLUTCH AND TRANSMISSION MECHANISM.

1,349,229.  Specification of Letters Patent.  Patented Aug. 10, 1920.

Application filed September 16, 1919. Serial No. 324,068.

*To all whom it may concern:*

Be it known that I, ONIAS C. SKINNER, a citizen of the United States, residing at Montrose, in the county of Montrose and State of Colorado, have invented certain new and useful Improvements in Gearless Rotary Clutch and Transmission Mechanism, of which the following is a specification, reference being had to the accompanying drawings.

This invention relates to power transmission clutches, and particularly to that class of clutches in which a driving element forming part of the clutch and a driven element forming part of the clutch are caused to rotate together at the same speed or to rotate at different speeds, or the driven element to remain stationary by means of a liquid medium disposed between the clutch elements and caused to circulate by the driving element, this liquid medium when its circulation is prevented, causing the driven element and driving element to rotate together.

The general object of my invention is to provide a simple and easily operated clutch and power transmission mechanism operated on the principle above set forth, in which the clutch members are engaged for a more or less unitary movement, by more or less obstructed flow of the liquid medium, and whereby the clutch elements are entirely disengaged by permitting full flow of the liquid medium, whereby without the use of gears, a driven shaft may be driven from a driving shaft either at the same speed as the latter or at any desired less speed, or whereby the driving shaft and driven shaft may be entirely disengaged.

A further object is to provide a mechanism of this character which may be applied to a large variety of machinery but which is particularly applicable for use in the power plants of automobiles, motor boats, and other motor driven vehicles.

A further object is to provide a power transmission mechanism and clutch which will do away with the use of change speed gears and the inconveniences attending such use, and permits changes of speed to be easily secured and permits any desired speed to be secured between the maximum speed, that of the driving shaft, and a minimum speed or complete stoppage of the driven shaft with relation to the driving shaft.

A further object is to provide a mechanism of this character which may be used for reversely driving a vehicle at any desired speed.

A further object is to provide a construction of this character in which the parts are so balanced that there will be no vibration in the shafts carrying the clutch members or in the clutch members themselves, thus permitting the mechanism to be driven at a high rate of speed.

A further object is to provide a mechanism wherein the driving clutch element is, generally speaking, in the form of a rotary pump having diametrically reciprocatable blades, and provide means whereby, when a blade is shifted, the pressure is removed from the blade so that there will be no obstruction to its shifting movement.

Other objects will appear in the course of the following description.

My invention is illustrated in the accompanying drawings, wherein:—

Figure 1 is a vertical longitudinal sectional view thereof through a clutch and transmission mechanism constructed in accordance with an embodiment of my invention, the rotor being in elevation;

Fig. 2 is a transverse sectional view on the line 3—3 of Fig. 1;

Fig. 3 is a side elevation of the rotor with the blades removed and the head separated from the body of the rotor;

Fig. 4 is an end view of the casing of the rotor;

Fig. 5 is a perspective view of the blades;

Fig. 6 is a perspective view of one form of speed controlling valve.

Referring to these drawings, it will be seen that I have provided an outer drum or casing 10 having heads 11 and 11ᵃ at its ends, these heads being grooved, as at 12, for the reception of the peripheral portion of the drum 10, and these heads being held engaged against the ends of the casing or peripheral portion of the drum by means of longitudinally extending bolts 13. The head 11ᵃ is formed to provide a step bearing for the inner drum, whose construction will be later described, and for the driving shaft 14, and this head 11ᵃ is provided with a suitable stuffing box for the passage of said shaft which, however, will prevent the passage of oil. The head 11 is connected to the driven shaft 15 in any suitable manner, this shaft, for instance, extending to the differential of the ordinary automobile.

At one point, the peripheral wall of the drum or casing 10 is provided with a well 16, whose purpose will be later described. Disposed within the outer drum is a rotor, designated generally 17. The rotor is also cylindrical with the periphery thereof and the peripheral wall of the casing or drum concentric to the axial center of the rotor and the periphery of said rotor is spaced from the peripheral wall of the drum or casing 10 to provide an annular liquid chamber also concentric to the axial center of the rotor. This rotor, as illustrated in Fig. 3, consists of two parts, the body 17 of the rotor being attached to or connected to the engine shaft 14 in the manner shown, and this body is longitudinally slotted, as at 18, from that end of the drum remote from the engine shaft. There are two of these slots 18 extending diametrically across the body 17 and intersecting each other, and these slots opening upon the end face of the body 17. The slots are closed by a head 19 forming part of the rotor and engaged therewith by screws 20. This head is formed with a centrally disposed lug or trunnion 21 which rotates within a bearing 22 formed in the head 11. It will be seen that this rotor can rotate freely within the outer casing 10.

Carried by the rotor are two diametrically extending blades 23 and 24, each of said blades being cut away, as at 25, so as to permit the passage of the other blade therethrough, these recesses 25 being long enough to permit a reciprocation of the blades diametrically across the rotor. Each blade at each end is longitudinally recessed or grooved, and disposed in this recess is a packing strip 26 urged outward by springs 27. These packing strips bear against the inner face of the rotor casing 10 and are in contact with the rotor casing to prevent the passage of oil around the piston or blade.

At a point substantially midway of the well 16 is a rotary valve 28, elliptical in cross section with its major cross sectional diameter substantially equal to the space between the base of the well 16 and the adjacent periphery of the rotor 17. The rotor is concentric to the rotor casing so as to provide an oil chamber or passage extending entirely around the rotor, the passage of oil through said chamber being controlled by the valve 28 which, when it is turned diametrically with relation to the rotor and casing, will contact at one end with the inner face of the off-set 16 and at its other end with the outer face of the rotor. It is necessary, of course, that the blades of the rotor should be forced inward so as to pass this valve, and to that end I form the inner faces of the heads 11 and 11ª with guide strips 29, shown as angular in cross section, with the outer flanges of which the ends of the blades are adapted to engage. As illustrated in Fig. 2, these guide strips 29 are arcuate in form and extend eccentrically to the center of rotation of the rotor and are so disposed that as the rotor rotates, the blade at one point A of the rotor casing will engage the guides and be gradually forced inward until it reaches a position where it will pass the valve 28. As one end of the blade is forced inward, the opposite end of the blade is, of course, forced outward until at the point B, it again contacts with the inner face of the casing 10. As illustrated in Fig. 2, the well 16 is arranged outwardly of the guide strips 29 and substantially midway between the points A and B and which points are spaced apart circumferentially of the peripheral wall of the casing or drum 10.

It will be obvious now that if the valve 28 be turned approximately parallel to the direction of movement of the rotor, the rotary movement of the rotor will cause the oil in the oil chamber to circulate with the rotor and which flow is materially facilitated by the cross sectional configuration of the valve 28 as the fluid will readily pass over the opposite faces of said valve and which action is materially facilitated by the well 16. The well 16 also serves to facilitate this flow as the well 16 is of a depth to compensate for the fluid or oil which would otherwise be displaced by the valve 28. If, however, the valve 28 be turned into a position at right angles to the direction of flow of the oil, this valve 28 will form a complete obstruction to the passage of oil, and as a consequence, the casing 10, which is connected to the driven shaft and forms the driven element of the clutch, will be caused to rotate at the same speed as the rotor, which is connected to the driving shaft and forms the driving element of the clutch. If the valve 28 is turned so as to permit some oil to pass, it is obvious that the casing 10 constituting the driven element of the clutch will rotate at a much slower speed than the driving element of the clutch, and by adjusting the position of the valve, any desired ratio can be secured between the speed of the driving element and the speed of the driven element.

I have illustrated the valve 28 mounted upon a spindle 30. This spindle 30 has attached thereto an arm 30ª connected by a link 31 to a bell crank lever 32, which is mounted upon a bracket 33 attached to the head 11, this bell crank lever being in turn pivotally connected to a sleeve 34 keyed upon the shaft 15 for sliding movement thereon but rotation therewith, this sleeve 34 being grooved for the reception of a shipper ring 35 having trunnions 36 operatively connected to a forked lever 37. This lever may be operated directly by the hand or may be connected to any suitable operative connections leading to the driver's seat. I have not shown these connections, as these will be obvious to anyone skilled in the art. It is plain now that upon an oscillation of the lever in one direction, the valve will be rotated to its closed position, and that upon an oscillation of the lever in the other direction, the valve will be rotated from its closed position toward its fully opened position, the amount of opening or closing movement of the valve being controlled, of course, by the amount of movement given to the lever.

The stem 30 of the valve is to pass, under any circumstances, through a stuffing box to prevent the leakage of oil. The casing is to be formed with a tap 40 at any desired point whereby oil may be introduced into the interior of the casing, this tap being normally closed by a plug. A drainage opening 41 may also be provided at any desired point whereby the oil may be drained from the casing, this opening being normally closed by a plug. This permits dirty oil to be taken out and clean put in.

I do not wish to be limited to the details of the construction illustrated, except as defined in the appended claims, as it is obvious that these details might be changed in many ways without departing from the spirit of the invention. The advantages of this construction will be obvious. It will be seen that it is extremely simple, having few parts and these positive in their operation. Furthermore, it is very compact, and inasmuch as all of the parts are practically concentric to the driving and driven shafts, it follows that there will be but little vibration. This mechanism in automobiles and like machinery will take the place of the clutch and transmission gearing which are ordinarily used, and as a transmission mechanism it will be obvious that it may be controlled so as to vary the speed of the driven mechanism through a relatively wide range and by the action of one controlling lever. On automobiles all the more or less complicated parts of the clutch and speed transmission gears may be done away with and the speed of the car controlled by the operation of one lever and without the usual clashing or grinding caused by gear transmission. There is no shifting of gears into or out of mesh with each other, which eliminates unnecessary wear. This clutch and transmission run in oil and thus there is but very little wear on the parts, and particularly on the piston blades at their point of contact with the periphery of the casing. The mechanism is also adapted to be used with the reverse gear of an automobile and thus it is obvious that the car may be caused to travel backward but at any desired speed and not at one speed, as is necessary to-day. It will be obvious that this clutch and transmission may be operated by one lever or by a pedal if desired and that the speed may be delicately graduated from nothing for the driven shaft up to a maximum, which is, of course, the speed of the driving shaft.

Furthermore, this gradual increase in speed of the driven shaft may be secured very gradually, thus relieving the driven shaft of tremendous strains which it undergoes to-day when the transmission gears are shifted from a lower speed to a relatively high speed. While this clutch transmission is particularly adapted for automobiles and like vehicles, it is obvious that it might be used for transmission mechanism of all kinds where it is desired to secure varying speeds for the driven shaft or driven element.

It is particularly pointed out that at the time that a blade is shifted, that is at the point A in Fig. 2, pressure on that particular blade is gradually relieved until the blade is fully shifted inward when pressure is entirely relieved, as its load is taken by the next blade behind and thus the blade which is shifted may be said to float in the oil.

I claim:—

1. In combination with driving and driven shafts, a cylindrical casing mounted on one of the shafts, a cylindrical rotor mounted on the second shaft and arranged within the casing, the periphery of the rotor and the peripheral wall of the casing being separated and concentric to the axial center of the rotor, the intervening space constituting an annular liquid chamber also concentric to the axial center of the rotor, the peripheral wall of the casing being provided with a well, a blade carried by the rotor and engaging the portion of the peripheral wall of the casing remote from the well, a rotary valve arranged within the liquid chamber at a point substantially midway the well, said valve being substantially elliptical in cross section with its major cross sectional dimension substantially equal to the space between the periphery of the rotor and the base of the well, said valve when radially disposed with respect to the rotor, preventing the flow of the liquid within the chamber, the side faces of the valve when the valve is in an open position permitting the liquid to freely flow thereover, and means for imparting rotary movement to the valve.

2. In combination with driving and driven shafts, a cylindrical casing mounted on one of the shafts and having its ends closed, a cylindrical rotor mounted on the second shaft and arranged within the casing, the periphery of the rotor and the peripheral wall of the casing being separated and concentric to the axial center of the rotor, the periphery of the rotor and the peripheral wall of the casing being separated to provide an annular liquid chamber also concentric to the axial center of the rotor, the ends of the casing being provided with complemental arcuate guideways leading from circumferentially spaced points on the peripheral wall of the casing, a blade disposed through the rotor and having sliding movement in a direction radial of the rotor, said blade being of a length greater than the diameter of the rotor, one end portion of the blade engaging the guideways to maintain the opposite end portion of the blade in contact with the portion of the peripheral wall of the casing inwardly of the guideways and between the points on said peripheral wall from which the guideways lead, the peripheral wall of the casing being provided with a well positioned outwardly of the guideways and substantially midway between the points on said peripheral wall from which the guideways lead, and a rotary valve arranged within the liquid chamber at a point substantially midway the well, said valve being substantially elliptical in cross section with its major cross sectional dimension substantially equal to the space between the periphery of the rotor and the base of the well, and means for imparting rotary movement to the valve.

In testimony whereof I hereunto affix my signature.

ONIAS C. SKINNER.